US009695876B2

United States Patent
Slayter et al.

(10) Patent No.: US 9,695,876 B2
(45) Date of Patent: Jul. 4, 2017

(54) BEARING RETENTION METHOD AND APPARATUS

(71) Applicant: Hamilton Sundstrand Corporation, Charlotte, NC (US)

(72) Inventors: Matthew Allen Slayter, Rockford, IL (US); Jeff A. Brown, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/811,874

(22) Filed: Jul. 29, 2015

(65) Prior Publication Data

US 2017/0030412 A1    Feb. 2, 2017

(51) Int. Cl.
F16C 35/063    (2006.01)
F16C 19/10     (2006.01)
F16C 43/04     (2006.01)

(52) U.S. Cl.
CPC ............ F16C 35/063 (2013.01); F16C 19/10 (2013.01); F16C 43/04 (2013.01); *Y10T 29/497* (2015.01); *Y10T 29/49696* (2015.01); *Y10T 29/49698* (2015.01); *Y10T 403/581* (2015.01); *Y10T 403/587* (2015.01)

(58) Field of Classification Search
CPC ......... Y10T 29/49696; Y10T 29/49698; Y10T 29/497; Y10T 403/587; Y10T 403/581
See application file for complete search history.

(56) References Cited

U.S. PATENT DOCUMENTS

| 1,535,739 | A | * | 4/1925 | Santos | B25D 17/04 403/221 |
|---|---|---|---|---|---|
| 1,899,343 | A | * | 2/1933 | Mackey | B21D 39/06 16/DIG. 42 |
| 3,434,761 | A | * | 3/1969 | Marley | F16C 17/024 384/103 |
| 3,648,348 | A | * | 3/1972 | Freimuth | F15B 15/1438 29/439 |
| 3,884,534 | A | * | 5/1975 | Winn | F16C 17/024 384/106 |
| 3,985,458 | A | * | 10/1976 | Snyder, Jr. | F16C 35/073 384/537 |
| 4,196,945 | A | * | 4/1980 | Miller, Jr. | F16C 17/024 384/106 |
| 4,229,054 | A | * | 10/1980 | Miller, Jr. | F16C 17/03 384/106 |

(Continued)

FOREIGN PATENT DOCUMENTS

EP    2559907 A1    2/2013

OTHER PUBLICATIONS

British Search Report, for British Patent Application No. GB1613040.3, dated Jan. 25, 2017, 3 pages.

*Primary Examiner* — Jason L Vaughan
(74) *Attorney, Agent, or Firm* — Kinney & Lange, P.A.

(57) ABSTRACT

A method of assembling a bearing assembly includes fitting a first ring onto a first end of a gear shaft. A second ring is fed into a slot in the first ring. The second ring is driven through the slot in the first ring. The second ring is positioned within the first ring. The second ring is positioned about the gear shaft such that a first end and a second end of the second ring are covered by a solid portion of the first ring.

11 Claims, 7 Drawing Sheets

(56) References Cited

U.S. PATENT DOCUMENTS

| | | | | |
|---|---|---|---|---|
| 4,415,280 A * | 11/1983 | Agrawal | ............... | F16C 17/024 |
| | | | | 384/103 |
| 4,415,281 A * | 11/1983 | Agrawal | ............... | F16C 17/024 |
| | | | | 267/158 |
| 4,498,874 A * | 2/1985 | Pichl | ..................... | B63H 23/34 |
| | | | | 285/305 |
| 4,522,515 A * | 6/1985 | Miki | ..................... | F16C 19/386 |
| | | | | 384/539 |
| 4,602,876 A * | 7/1986 | Miki | ..................... | F16C 35/067 |
| | | | | 384/539 |
| 4,699,523 A * | 10/1987 | Hagemeister | ......... | F16C 17/024 |
| | | | | 384/103 |
| 5,228,785 A * | 7/1993 | Saville | .................. | F16C 17/024 |
| | | | | 384/103 |
| 6,626,581 B2 * | 9/2003 | Uchman | ................. | B60B 27/00 |
| | | | | 384/544 |
| 6,902,325 B1 * | 6/2005 | Uchman | ................. | B60B 27/00 |
| | | | | 384/544 |
| 8,783,952 B1 * | 7/2014 | Beers | ..................... | F16C 43/02 |
| | | | | 384/103 |
| 2010/0143065 A1 | 6/2010 | Zink et al. | | |
| 2014/0369784 A1 | 12/2014 | Lagarde et al. | | |

\* cited by examiner

BEARING RETENTION METHOD AND APPARATUS

BACKGROUND

The present disclosure is directed generally to a retention method, and more specifically, to a retention method and apparatus for a bearing assembly on a gear shaft.

Bearing retention often includes the use of threaded lock-nuts to secure bearings along a gear shaft. Threaded bearing retention features can require significant torque. The friction retention required with threaded retention features can also sustain critical failure during vibration or modal events during use of the assembly.

SUMMARY

A method of assembling a bearing assembly includes fitting a first ring onto a first end of a gear shaft. A second ring is fed into a slot in the first ring. The second ring is driven through the slot in the first ring. The second ring is positioned within the first ring. The second ring is rotated about the gear shaft such that a first end and a second end of the second ring are covered by a solid portion of the first ring.

A method of assembling a bearing assembly includes fitting a first ring onto a first end of a gear shaft. The first ring is positioned adjacent to a bearing stack and is press-fit onto the gear shaft. A second ring is fed into a slot in the first ring. The second ring is driven through the slot in the first ring. The second ring is positioned within the first ring. The second ring is positioned in between a first circumferential groove along an inner surface of the first ring and a second circumferential groove along an outer surface of the gear shaft. The second ring is rotated about the gear shaft such that a first end and a second end of the second ring are covered by a solid portion of the first ring. The second ring is pulled by either a first hole located in the first end of the second ring or a second hole located in the second end of the second ring.

An assembly for the retention of a bearing includes a first ring with a first groove. The first groove extends circumferentially along an inner surface of the first ring. The first ring includes at least one slot. A second ring includes a first circumferential end and a second circumferential end. The second ring is configured to be fed through the at least one slot and positioned within the groove of the first ring.

DETAILED DESCRIPTION

Figure 1:
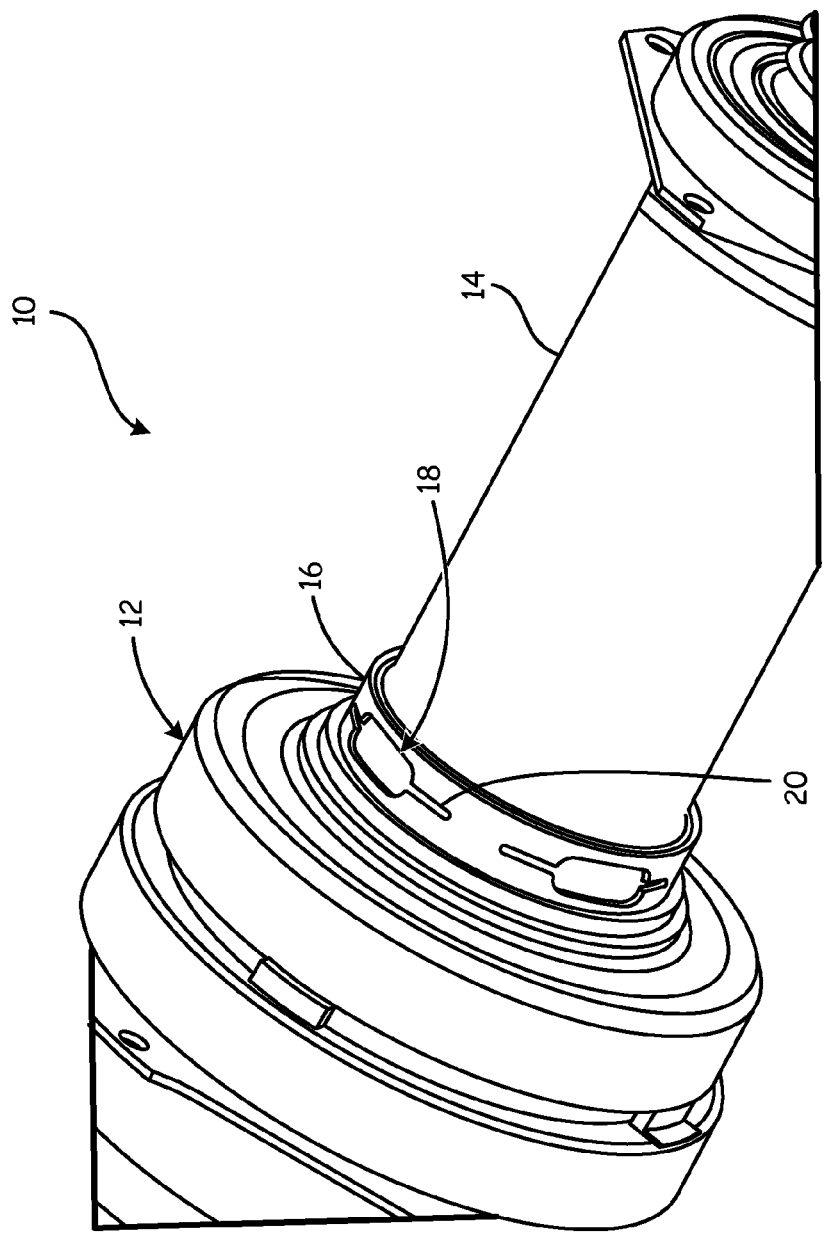
FIG. 1 is a perspective view of a bearing assembly.

FIG. 1 is a perspective view of bearing assembly 10. Bearing assembly 10 includes bearing stack 12, gear shaft 14, and lock ring 16. Bearing stack is concentrically mounted onto gear shaft 14. Lock ring 16 is fitted onto gear shaft 14 adjacent to bearing stack 12. Lock ring 16 can be press fit onto gear shaft 14.

Bearing stack 12 may include one or more ball bearing components configured to allow gear shaft 14 to rotate relative to bearing stack 12. Gear shaft 14 may include a solid metal such as carbon steel or other types of steel alloys. Lock ring 16 may include a hard metal material, and may specifically include hardened steel.

Bearing assembly 10 may be used in connection with an accessory gearbox of an aircraft to provide auxiliary power to non-propulsion systems of the aircraft by pulling power off of the engine and supplying secondary power to accessories of an aircraft. Bearing assembly 10 can operate in an environment where gear shaft 14 rotates at a rate within the range of 0-12,000 revolutions per minute ("rpm"). Gear shaft 14 may also operate at a higher rpm depending on the specific use of bearing assembly 10. Bearing assembly 10 is configured to operate in a temperature environment of up to 300 degrees Celsius.

As will be described more in depth with reference to FIG. 2, lock ring 16 includes slots 18. There may be at least one of slots 18. Slots 18 may include channels 20.

Previous bearing retention assemblies include the use of threaded locknuts to secure bearings to the gear shaft. The application of threaded locknuts can sometimes include a significant amount of torque placed on the nut which may cause damage to the bearing assembly. Additionally, vibrations caused during operations of the bearing assembly may reduce the friction retention feature of the threaded locknuts. Bearing assembly 10 does not include a threadable engagement and therefore eliminates the possibility of friction reduction due to operational vibrations. The cost of a high priced lock-nut is also eliminated by the use of lock ring 16 in bearing assembly 10 because the cost to manufacture lock ring 16 is much less than a threaded locknut.

Figure 2:
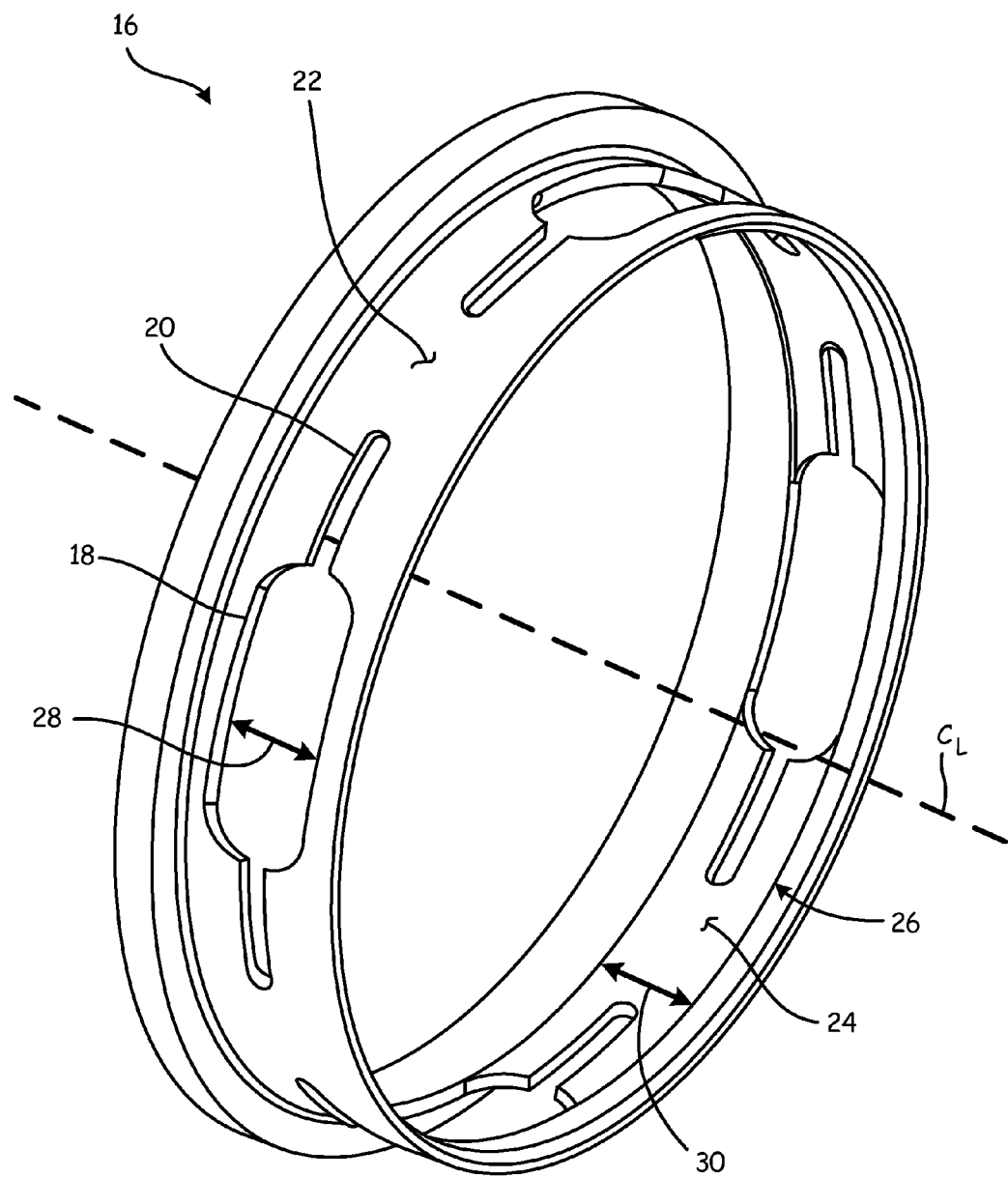
FIG. 2 is a perspective view of a lock ring.

FIG. 2 is a perspective view of lock ring 16. Lock ring 16 generally includes a tube shape, and is formed in the shape of a ring or hoop. Lock ring 16 includes slots 18. There may be at least one of slots 18. Slots 18 include an aperture extending through from outer surface 22 of lock ring 16 to inner surface 24 of lock ring 16. Slots 18 may include channels 20. Channels 20 may extend circumferentially in a first and second direction from at least one of slots 18. The first direction may be in a circumferentially opposite direction to the second direction. Slots 18 can be positioned around lock ring 16 in symmetrical pattern around lock ring 16, and/or positioned such that the distance between adjacent slots 18 is equal between each individual slots 18. Slots 18 may be dispersed along lock ring 16 with uniform spacing between consecutive slots to balance lock ring 16. The positioning of slots 18 along lock ring 16 can be based on balancing, weight, cost, material, and/or other requirements as necessary to meet any design constraints of bearing assembly 10. Lock ring 16 is concentric with centerline $C_L$ of bearing assembly 10.

Lock ring 16 also includes groove 26 along inner surface 24 of lock ring 16. Groove 26 is impressed into inner surface 24 of lock ring 16 such that the thickness of lock ring 16 along groove 26 is radially thinner than the portion of lock ring 16 that does not include groove 26. Described alternatively, groove 26 includes a larger inner diameter than the portion of lock ring 16 that does not include groove 26.

Width 28 of slots 18 in an axial direction and width 30 of groove 26 in an axial direction are substantially equal in distance. Alternatively, width 28 of slots 18 in an axial direction may be more or less than width 30 of groove 26 in an axial direction. Slots 18 are configured to accept a spring ring that can be fed into slot 18, as will be discussed in further detail below.

Figure 3:
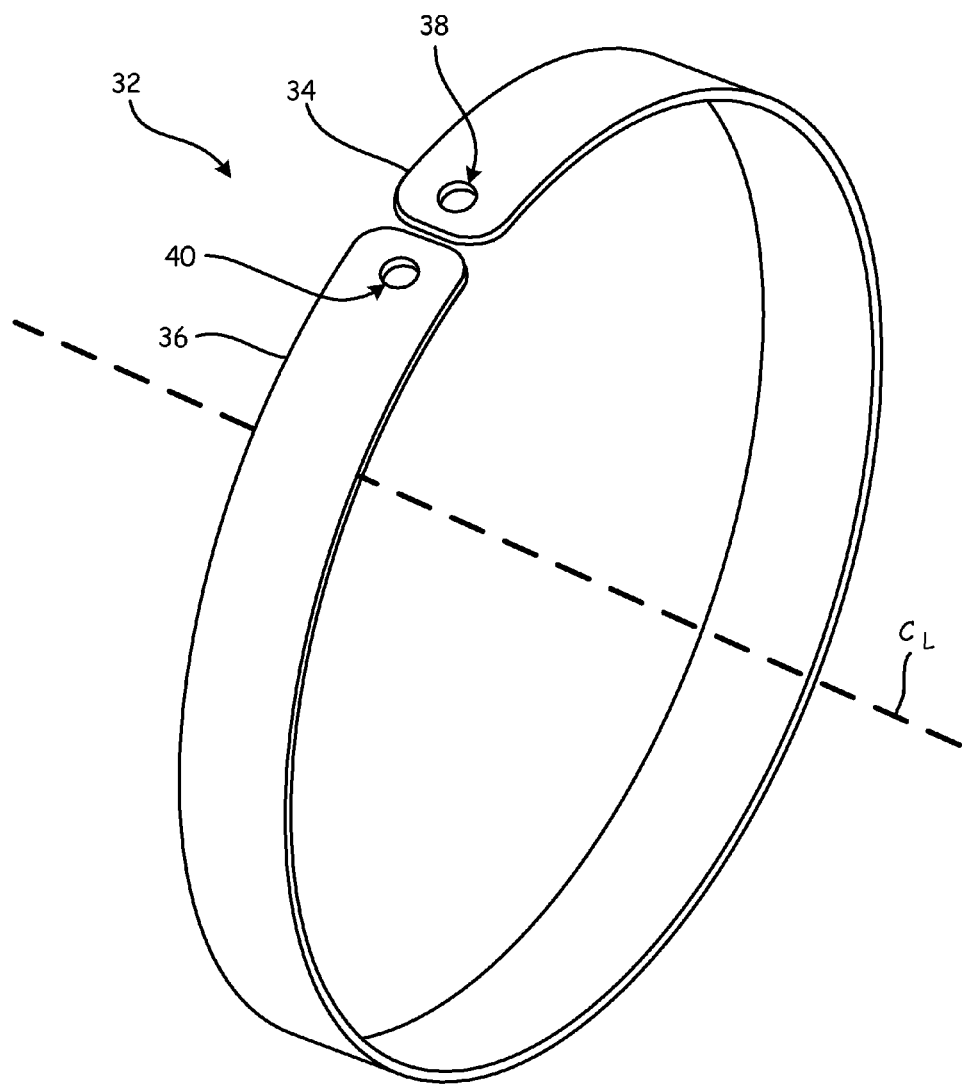
FIG. 3 is a perspective view of spring ring.

FIG. 3 is a perspective view of spring ring 32. Spring ring 32 includes first end 34, second end 36, first hole 38, and second hole 40. First hole 38 is located at first end 34 of spring ring 32 and second hole 40 is located at second end 36 of spring ring 32.

Spring ring 32 includes a generally cylindrical shape with a gap between first end 34 and second end 36. Spring ring 32 is configured to flex such that an effective diameter of spring ring 32 can increase or decrease. Spring ring 32 can be straightened by pulling first end 34 away from second end 36. Spring ring 32 is concentric with centerline $C_L$ of bearing assembly 10.

Spring ring 32 can include 316 stainless steel, spring steel, or another type of resilient metal that allows spring ring 32 to maintain its shape after being straightened.

Figure 4:
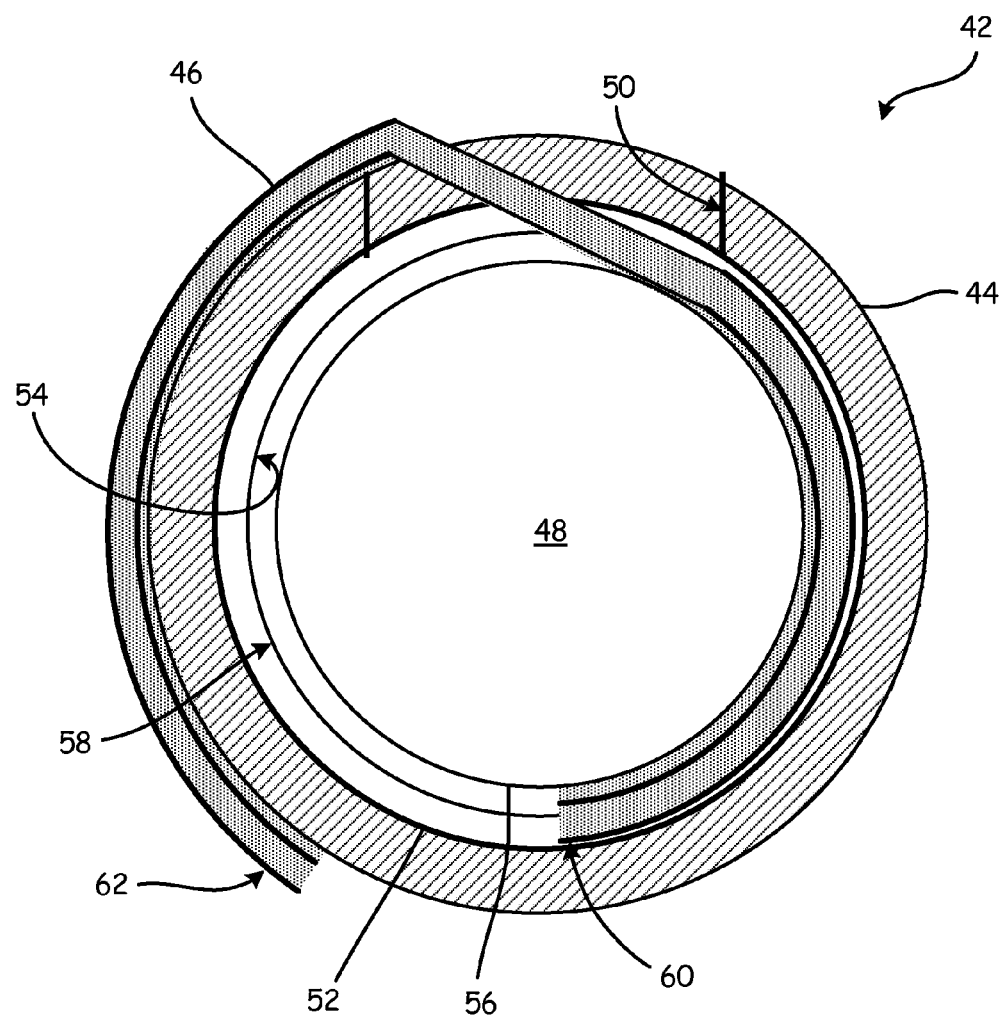
FIG. 4 is a sectional view of a ring assembly.

FIG. 4 is a sectional view of bearing assembly 42. Bearing assembly 42 includes lock ring 44, spring ring 46, and gear shaft 48. Lock ring 44 includes slot 50 and first groove 52 along inner surface 54 of lock ring 44 to receive spring ring 46. Gear shaft 48 includes second groove 56 along outer surface 58 of gear shaft 48 to receive spring ring 46.

Lock ring 44 can be fitted onto gear shaft 48 by press-fitting. Spring ring 46 is fed into slot 50 in lock ring 44. Spring ring 46 is driven through slot 50 in lock ring 44. Spring ring 46 is positioned within lock ring 44. Spring ring 46 is rotated about gear shaft 48 such that first end 60 and second end 62 of spring ring 46 are covered by a solid portion of lock ring 44. Spring ring 46 is positioned in between first groove 52 and second groove 54. As can be seen in FIG. 4, installation of spring ring 46 includes deforming spring ring 46 from a generally uniform circular shape to create a smaller or larger radius so as to allow spring ring 46 to be fed into slot 50 and follow the contour of first groove 52 and second groove 54 as spring ring 46 is rotated around gear shaft 48. Spring ring 46 can be removed by the opposite process.

Figure 5A:
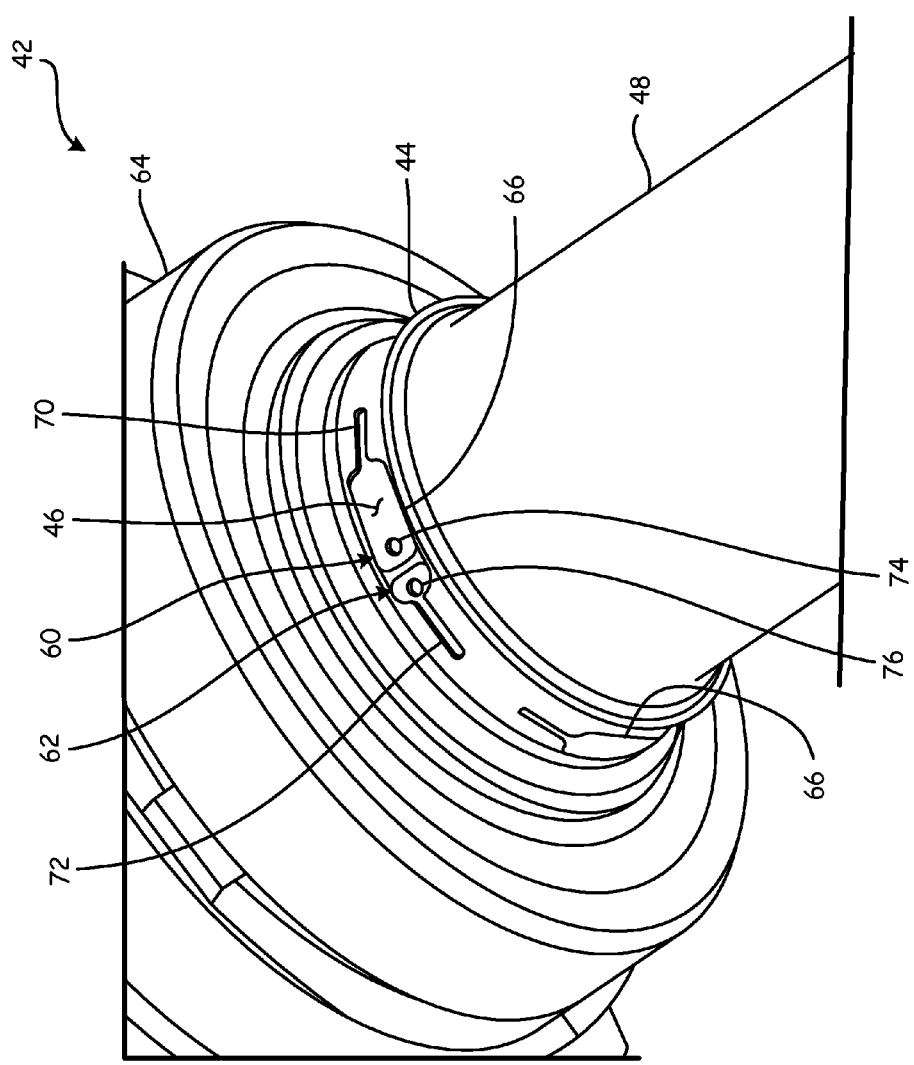
FIG. 5A is a perspective view of a bearing assembly in a first position.

FIG. 5A is a perspective view of bearing assembly 42 with bearing stack 64 with lock ring 44 and spring ring 46 in a first position. Bearing stack 64 is positioned on gear shaft 48 and adjacent to lock ring 44. Lock ring 44 includes slots 66 with channels 68. Slots 66 can include at least one slot. Each of the at least one of slots 66 includes first channel 70 extending circumferentially in a first direction from the at least one of slots 66 and second channel 72 extending circumferentially in a second direction from the at least one of slots 66 in a second direction opposite the first direction.

In FIG. 5A, spring ring 46 has been completely fed through slot 66 and all of spring ring 46 is positioned within lock ring 44. The position of spring ring 46 in FIG. 5A includes a first position with first end 60 and second end 62 of spring ring 46 are circumferentially positioned within and in radial alignment with one of slots 66. Spring ring 46 is rotated by pulling one of first hole 74 or second hole 76 such that spring ring 46 rotates about gear shaft 48 until both first end 60 and second end 62 of spring ring 46 slide in between gear lock ring 44 and shaft 48.

Figure 5B:
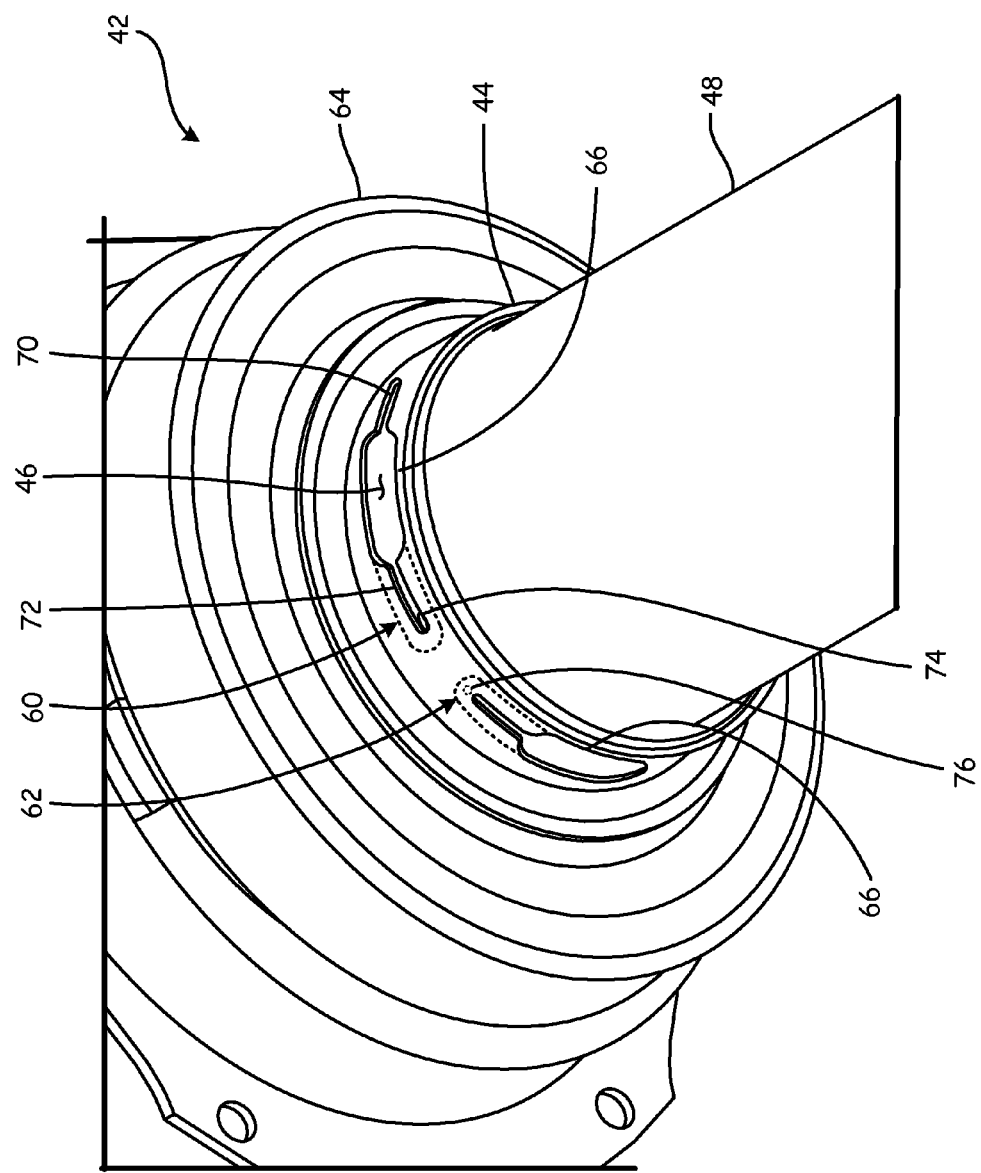
FIG. 5B is a perspective view of a bearing assembly in a second position.

FIG. 5B is a perspective view of bearing assembly 42 with bearing stack 64 with lock ring 44 and spring ring 46 in a second position. In FIG. 5B, spring ring 46 has been completely fed through slot 66 and all of spring ring 46 is positioned within lock ring 44. The position of spring ring 46 in FIG. 5B includes a second position with first end 60 and second end 62 of spring ring 46 are covered by a solid portion of lock ring 44. Spring ring 46 is rotated by pulling one of first hole 74 or second hole 76 such that spring ring 46 rotates about gear shaft 48 until both first end 60 and second end 62 of spring ring 46 rotate underneath a solid portion of gear lock ring 44.

Figure 6:
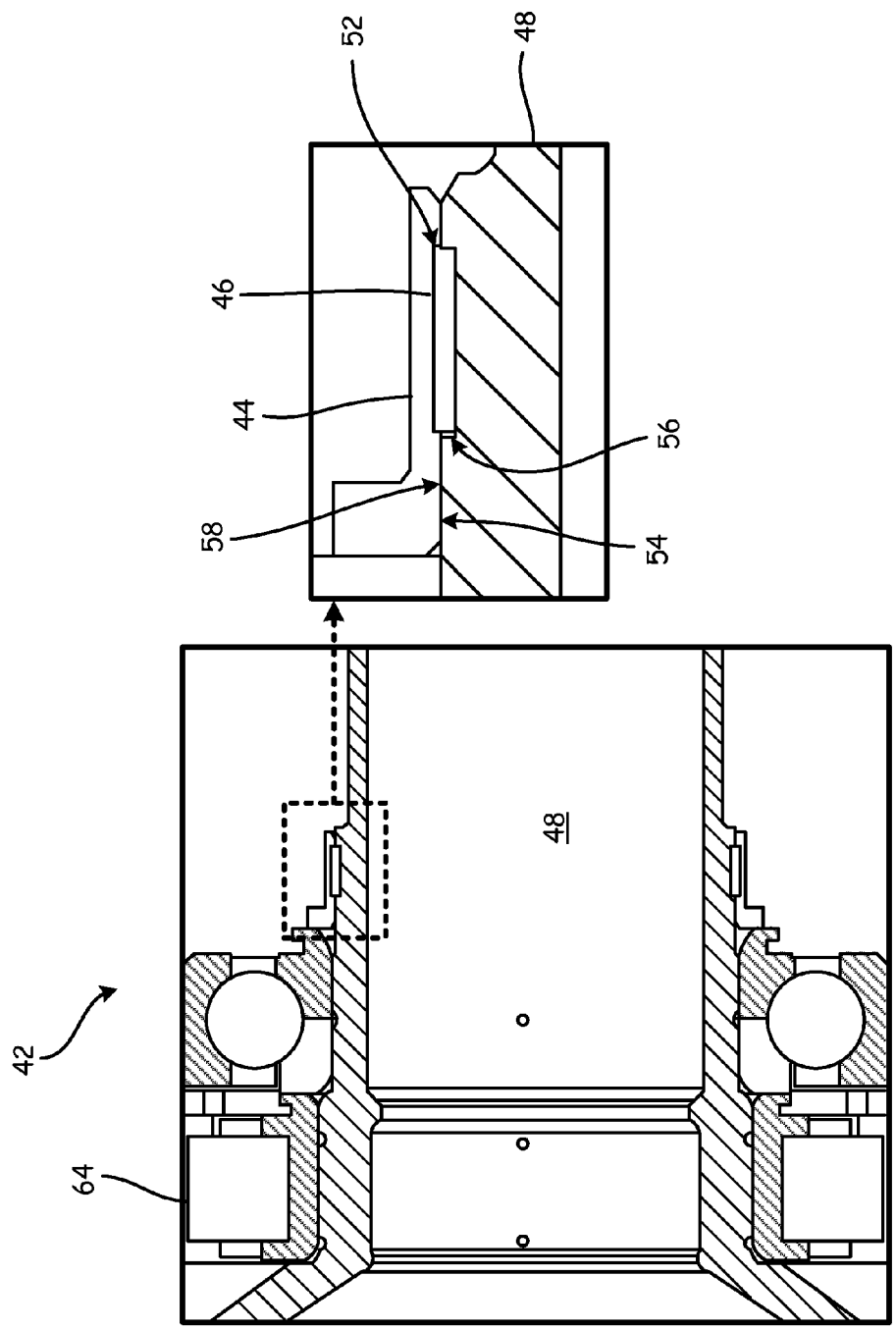
FIG. 6 is a sectional view of a bearing assembly.

FIG. 6 is a sectional view of bearing assembly 42 with bearing stack 64, lock ring 44, and spring ring 46. Lock ring 44 is press-fit onto gear shaft 48 at a location adjacent to bearing stack 64. Bearing stack 64 is mounted onto and concentric with gear shaft 48. Lock ring 44 includes first groove 52 along inner surface 54 of lock ring 44. Gear shaft 48 includes second groove 56 along outer surface 58 of gear shaft 48. Spring ring 46 is positioned in between first groove 52 and second groove 54. The engagement of gear shaft 48 and spring ring 46 prohibits spring ring 46 from moving in an axial direction relative to gear shaft 48. Correspondingly, the engagement of spring ring 46 with lock ring 44 prohibits lock ring 44 from moving in an axial direction relative to gear shaft 48.

The engagements between gear shaft 48, spring ring 46, and lock ring 44 can be used to prohibit bearing stack 64 from axial movement relative to gear shaft 48 without the use of a threaded engagement with respect to prior art threaded lock rings and eliminates the corresponding deficiencies in such prior art designs. During operation of bearing assembly 42, spring ring 46 must be sheared for the retention feature of lock ring 44 to fail. Spring ring 46 eliminates the use of a threadable engagement and subsequent risk of over-torqueing bearing assembly 42. The configuration of bearing assembly 42 also increases the shear strength of bearing assembly 42 by requiring a failure event to shear spring ring 46 as opposed to the threading of a prior art threadable engagement with less shear strength than spring ring 46 and lock ring 44.

Discussion of Possible Embodiments

The following are non-exclusive descriptions of possible embodiments of the present disclosure.

A method of assembling a bearing assembly may include fitting a first ring onto a first end of a gear shaft. A second ring may be fed into a slot in the first ring. The second ring may be driven through the slot in the first ring. The second ring may be positioned within the first ring. The second ring may be rotated about the gear shaft such that a first end and a second end of the second ring may be covered by a solid portion of the first ring.

The method of the preceding paragraph can optionally include, additionally and/or alternatively, any one or more of the following features, configurations and/or additional components:

a further embodiment of the method, wherein rotating the second ring about the gear shaft may further include pulling the second ring by either a first hole located in the first end of the second ring or a second hole located in the second end of the second ring;

a further embodiment of the foregoing storage assembly, wherein rotating the second ring about the gear shaft may further include pulling the second ring by either a first hole located in the first end of the second ring or a second hole located in the second end of the second ring;

a further embodiment of the method, wherein fitting a first ring onto a first end of a gear shaft may further include positioning the first ring adjacent to a bearing stack a further embodiment of the method, wherein fitting a first ring onto a first end of a gear shaft may further include press-fitting the first ring onto the gear shaft;

a further embodiment of the method, wherein the method may further include positioning the second ring in between a first circumferential groove along an inner surface of the first ring and a second circumferential groove along an outer surface of the gear shaft;

a further embodiment of the method, wherein the method may further include connecting the bearing assembly to an accessory gearbox of an aircraft engine;

a further embodiment of the method, wherein the method may further include operating the gear shaft between 0 and 12,000 rpm; and/or a further embodiment of the method, wherein the method may further include operating the bearing assembly in an environment with a temperature of less than or equal to 300 degrees Celsius.

A method of assembling a bearing assembly may include fitting a first ring onto a first end of a gear shaft. The first ring may be positioned adjacent to a bearing stack and may be press-fit onto the gear shaft. A second ring may be fed into a slot in the first ring. The second ring may be driven through the slot in the first ring. The second ring may be positioned within the first ring. The second ring may be positioned in between a first circumferential groove along an inner surface of the first ring and a second circumferential groove along an outer surface of the gear shaft. The second ring may be rotated about the gear shaft such that a first end and a second end of the second ring may be covered by a solid portion of the first ring. The second ring may be pulled by either a first hole located in the first end of the second ring or a second hole located in the second end of the second ring.

The method of the preceding paragraph can optionally include, additionally and/or alternatively, any one or more of the following features, configurations and/or additional components:

a further embodiment of the method, wherein the method may further include connecting the bearing assembly to an accessory gearbox of an aircraft engine;

a further embodiment of the method, wherein the method may further include operating the gear shaft between 0 and 12,000 rpm; and/or a further embodiment of the method, wherein the method may further include operating the bearing assembly in an environment with a temperature of less than or equal to 300 degrees Celsius.

An assembly for the retention of a bearing may include a first ring with a groove in the first ring. The first groove may extend circumferentially along an inner surface of the first ring. There may be at least one slot in the first ring. A second ring may include a first circumferential end and a second circumferential end. The second ring may be configured to be fed through the at least one slot and may be positioned within the groove of the first ring.

The assembly of the preceding paragraph can optionally include, additionally and/or alternatively, any one or more of the following features, configurations and/or components:

a further embodiment of the foregoing assembly, wherein each of the at least one slot may include a first channel extending circumferentially in a first direction from the at least one slot and/or a second channel extending circumferentially in a second direction from the at least one slot in a second direction opposite the first direction;

a further embodiment of the foregoing assembly, wherein a width of the first groove in an axial direction may be equal in distance to a width of the at least one slot in the axial direction;

a further embodiment of the foregoing assembly, wherein the first circumferential end of the second ring may include a first hole and the second circumferential end of the second ring may include a second hole;

a further embodiment of the foregoing assembly, wherein the second ring may be capable of deforming so as to create a smaller or larger radius of the second ring;

a further embodiment of the foregoing assembly, wherein the assembly may include a gear shaft, a bearing stack that may include at least one bearing, wherein the bearing stack may be mounted onto and concentric with the gear shaft, and/or the apparatus may be disposed on the bearing shaft adjacent to the bearing stack;

a further embodiment of the foregoing assembly, wherein the first ring comprises a hardened metal material; and/or a further embodiment of the foregoing assembly, wherein the second ring comprises a resilient metal material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of assembling a bearing assembly, the method comprising:
   fitting a first ring onto a first end of a gear shaft;
   feeding a second ring into a slot in the first ring;
   driving the second ring through the slot in the first ring;
   positioning the second ring within the first ring;
   positioning the second ring in between a first circumferential groove along an inner surface of the first ring and a second circumferential groove along an outer surface of the gear shaft; and
   rotating the second ring about the gear shaft such that a first end and a second end of the second ring are covered by a solid portion of the first ring.

2. The method of claim 1, wherein rotating the second ring about the gear shaft further includes pulling the second ring by either a first hole located in the first end of the second ring or a second hole located in the second end of the second ring.

3. The method of claim 1, wherein fitting a first ring onto a first end of a gear shaft further includes positioning the first ring adjacent to a bearing stack.

4. The method of claim 1, wherein fitting a first ring onto a first end of a gear shaft further includes press-fitting the first ring onto the gear shaft.

5. The method of claim 1 further including connecting the bearing assembly to an accessory gearbox of an aircraft engine.

6. The method of claim 1 further including operating the gear shaft between 0 and 12,000 rpm.

7. The method of claim 1 further including operating the bearing assembly in an environment with a temperature of less than or equal to 300 degrees Celsius.

8. A method of assembling a bearing assembly, the method comprising:
   fitting a first ring onto a first end of a gear shaft, wherein fitting a first ring onto a first end of a gear shaft further includes positioning the first ring adjacent to a bearing stack and press-fitting the first ring onto the gear shaft;
   feeding a second ring into a slot in the first ring;

driving the second ring through the slot in the first ring;
positioning the second ring within the first ring;
positioning the second ring in between a first circumferential groove along an inner surface of the first ring and a second circumferential groove along an outer surface of the gear shaft; and
rotating the second ring about the gear shaft such that a first end and a second end of the second ring are covered by a solid portion of the first ring, wherein rotating the second ring further includes pulling the second ring by either a first hole located in the first end of the second ring or a second hole located in the second end of the second ring.

9. The method of claim 8 further including connecting the bearing assembly to an accessory gearbox of an aircraft engine.

10. The method of claim 8 further including operating the gear shaft between 0 and 12,000 rpm.

11. The method of claim 8 further including operating the bearing assembly in an environment with a temperature less than or equal to 300 degrees Celsius.

\* \* \* \* \*